United States Patent
Gardner

(10) Patent No.: US 10,148,756 B2
(45) Date of Patent: Dec. 4, 2018

(54) LATENCY VIRTUALIZATION IN A TRANSPORT NETWORK USING A STORAGE AREA NETWORK

(71) Applicant: AT&T Intellectual Property I, L.P., Atlanta, GA (US)

(72) Inventor: James A. Gardner, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 324 days.

(21) Appl. No.: 14/964,106

(22) Filed: Dec. 9, 2015

(65) Prior Publication Data

US 2017/0171310 A1    Jun. 15, 2017

(51) Int. Cl.
*H04L 29/08* (2006.01)
*H04L 12/727* (2013.01)
*H04L 12/911* (2013.01)

(52) U.S. Cl.
CPC ........ *H04L 67/1097* (2013.01); *H04L 45/121* (2013.01); *H04L 47/741* (2013.01); *H04L 67/2852* (2013.01)

(58) Field of Classification Search
CPC ............. H04L 67/1097; H04L 67/2842; H04L 67/1008; H04L 45/121
USPC ........................................................ 709/216
See application file for complete search history.

(56) References Cited

U.S. PATENT DOCUMENTS

| | | | |
|---|---|---|---|
| 8,892,982 B2 | 11/2014 | Gardner | |
| 9,100,282 B1 | 8/2015 | Raps et al. | |
| 9,137,161 B2 | 9/2015 | Zhang et al. | |
| 9,160,650 B2 | 10/2015 | Zhang et al. | |
| 9,178,807 B1 | 11/2015 | Chua et al. | |
| 2011/0138246 A1* | 6/2011 | Gardner | H04L 1/1874 714/749 |
| 2014/0192645 A1 | 7/2014 | Zhang et al. | |
| 2014/0280838 A1 | 9/2014 | Finn et al. | |
| 2014/0280864 A1 | 9/2014 | Yin et al. | |
| 2015/0039744 A1 | 2/2015 | Niazi et al. | |
| 2015/0112933 A1 | 4/2015 | Satapathy | |
| 2015/0188772 A1 | 7/2015 | Gasparakis | |

(Continued)

FOREIGN PATENT DOCUMENTS

EP      2448196 A1 *   5/2012      H04L 45/121

OTHER PUBLICATIONS

"Data Center Solutions Guide" A Solution White Paper.2014. pp. 1-53.

(Continued)

*Primary Examiner* — Tu T Nguyen

(57) ABSTRACT

Methods, computer-readable media and devices are disclosed for caching traffic of a transmission in a storage resource of a storage area network when a route for the transmission fails to satisfy a latency requirement. For example, a processor may receive a latency requirement for a transmission via a communications network, select a route for the transmission through the communications network, submit to a storage area network a request for a storage resource for the transmission and receive from the storage area network a notification of a storage resource of the storage area network assigned to the transmission. When the route fails to satisfy the latency requirement, the processor may cache traffic of the transmission in the storage resource.

20 Claims, 4 Drawing Sheets

(56) References Cited

U.S. PATENT DOCUMENTS

2015/0215219 A1  7/2015 Mattsson et al.
2015/0319245 A1* 11/2015 Nishihara ............. G06F 3/0604
                                                709/213

OTHER PUBLICATIONS

Chen, Xu, "Intelligence on Optical Transport SDN". Jan. 2015. pp. 1-4.

* cited by examiner

LATENCY VIRTUALIZATION IN A TRANSPORT NETWORK USING A STORAGE AREA NETWORK

The present disclosure relates generally to routing of transmissions with latency requirements, and more particularly, to methods, computer-readable media and devices for caching traffic of the transmission in a storage resource of a storage area network when a network route for the transmission does not satisfy a latency requirement.

BACKGROUND

Data communications networks increasingly use mesh or connectionless transport of data. Many applications either require minimal network latency, or cannot tolerate wide momentary swings in latency, or both. However, mesh networks may be unable to meet one or both of these requirements.

SUMMARY

In one example, the present disclosure discloses a method, computer-readable medium, and device for caching traffic of a transmission in a storage resource of a storage area network when a route for the transmission fails to satisfy a latency requirement. For example, a processor may receive a latency requirement for a transmission via a communications network, select a route for the transmission through the communications network, submit to a storage area network a request for a storage resource for the transmission and receive from the storage area network a notification of a storage resource of the storage area network assigned to the transmission. When the route does not satisfy the latency requirement, the processor may cache traffic of the transmission in the storage resource.

In another example, the present disclosure discloses a further method, computer-readable medium, and device for caching traffic of a transmission in a storage resource of a storage area network when a route for the transmission fails to satisfy a latency requirement. For example, a processor may receive a request for a storage resource of a storage area network for a transmission via a communications network and assign the transmission to the storage resource. In one example, one or more additional transmissions are also assigned to the storage resource. The processor may further receive a notification that a route for the transmission has failed to satisfy a latency requirement and reassign the additional transmission to a different storage resource of a plurality of storage resources of the storage area network.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
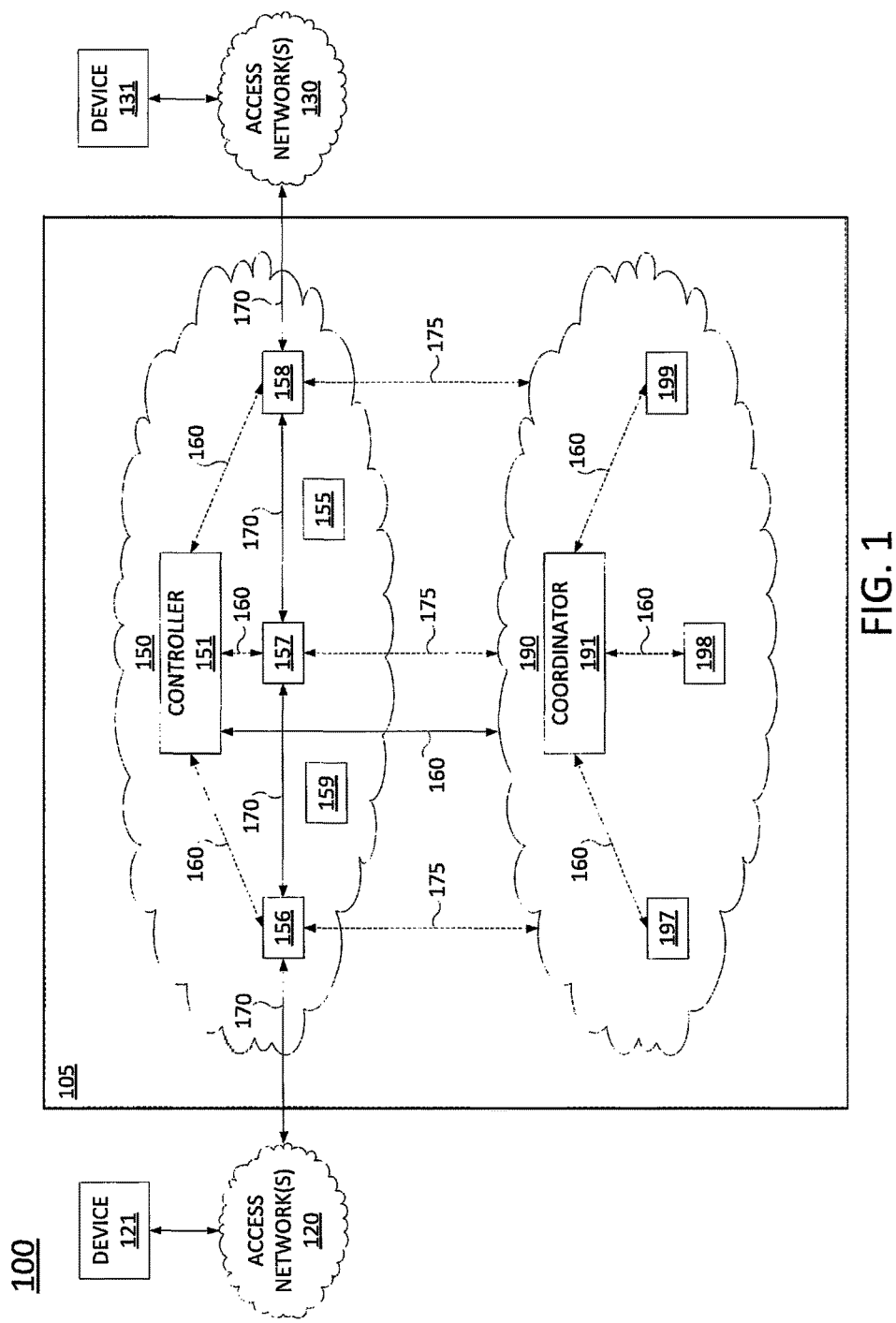
FIG. 1 illustrates an example system related to the present disclosure.

The present disclosure broadly discloses methods, computer-readable media and devices for caching traffic of a transmission in a storage resource of a storage area network when a route for the transmission does not satisfy a latency requirement. The traffic may comprise a portion of the transmission, e.g., a sequence or flow, comprising one or more packets, segments, datagrams, frames, cells, protocol data units, service data unit, bursts, and so forth. The particular terminology or types of data units involve may vary depending upon the underlying network technology. Thus, the term "transmission" is intended to refer to any quantity of data to be sent from a source to a destination through the communications network, and the term "traffic" is intended to refer to at least a portion of the transmission.

In one example, the present disclosure relates to a communications network that uses software-defined storage (SDS), such as a storage area network (SAN), for caching traffic of a transmission to address network latency issues in a cloud transport environment. For example, the communications network may comprise a software-defined network (SDN). In one example, the communications network comprises a multi-protocol label switching (MPLS) network, where label switched routes (LSRs) can be assigned for routing Transmission Control Protocol (TCP)/Internet Protocol (IP) packets, User Datagram Protocol (UDP)/IP packets, and other types of protocol data units (PDUs). However, it will be appreciated that the present disclosure is equally applicable to other types of data units and transport protocols, such as frame relay, and ATM. In one example, a source device, or an application of the source device, may have packets or other data units to transmit from the source device to a destination via the communications network, also referred to herein as a transport network. The source device may communicate via an application program interface (API) with a controller of the transport network and notify the controller of an intended transmission, a destination, and other parameters, such as a bandwidth requirement, a latency requirement, a recovery point objective (RPO), a recovery time objective (RTO), various other quality of service (QoS) requirements, and so forth. The controller may allocate a route comprising transport nodes and links in the transport network to accommodate the transmission. In one example, the controller initially selects transport nodes and links in the transport network such that the latency requirement and/or other requirements are met. For example, certain applications such as streaming video, synchronous storage or data mirroring, and other applications may suffer from performance limitations or errors if there is an excessive network latency. The controller may monitor the transmission on the route for compliance with the latency requirement and other parameters. However, since the transport network is subject to disruptions, it is possible that the performance of the route may degrade such that the earlier selected route is no longer able to meet the latency requirement. For instance, the detected latency can fail to meet a latency requirement due to a number of issues, such as a failure of a link, congestion on a link, a failure of a transport node, congestion at the transport node, a problem at a destination device or in an access network utilized by the destination device, and so forth.

In one example, the controller requests at least one storage resource from a storage area network (SAN). For example, the controller may forward various parameters for the transmission to a SAN coordinator, also referred to as a SAN hypervisor, or a SAN orchestrator. The SAN coordinator may then reserve or assign one or more storage resources from a shared pool of storage resources of the storage area network to the transmission. In one example, the SAN coordinator may assign/allocate storage resources that are located close or near to the transport nodes of the route that is allocated by the controller for the transmission. For instance, storage resources may be located remote from the transport nodes. However, selecting storage resources closer to the transport nodes may better ensure that the routing of traffic to a storage resource does not also suffer from latency issues. For example, the SAN coordinator may avoid a storage resource where a route to the storage resource is longer or has greater delay than the transport route for the transmission through the transport network.

In one example, the controller may provide to the SAN coordinator information regarding the source, the destination, a bandwidth requirement, a latency requirement, an RTO requirement, an RPO requirement, a requested storage amount, the transport nodes and links in the transport network comprising the route that has been allocated to the transmission, a security requirement, and so forth. Thus, the SAN coordinator may be able to select storage resources that are closest to the route assigned by the controller, or which are optimized based upon any other criteria in view of the parameters provided by the controller to the SAN coordinator. In one example, the storage area network may utilize any type of storage that is available and that may be matched to the requirements of a transmission, such as disks for long term storage, random access memory (RAM) for short term storage, flash memory for short term storage that cannot tolerate power loss, and so forth.

In one example, a storage resource is not exclusively assigned to the transmission, but may be assigned/allocated to a number of transmissions utilizing various routes in the transport network. For example, the SAN coordinator may set aside at least one storage resource or may make a notation that the at least one storage resource may be required for the transmission. The at least one storage resource could be provisionally available to other transmissions that may also have a use for the storage resource(s). In other words, the storage resources may comprise a caching pool that covers a plurality of different transmissions. As such, the storage resources may not be exclusively allocated to a transmission unless and until actually needed by the transmission, e.g., when a latency requirement is not met. In addition, if an assigned storage resource or a set of storage resources is not utilized for the particular transmission, traffic for other transmissions that may suffer from latency issues may instead utilize the storage resource(s). In such case, different storage resources may dynamically be reassigned for use by the one or more other transmissions that may have been previously assigned to the same storage resource.

If the latency for a transmission is excessive, the controller may advise the SAN coordinator to begin caching traffic of the transmission using the at least one storage resource. For instance, the source may continue to send traffic towards the destination at a desired rate. In one example, the controller may advise the requesting device and/or application (which may also comprise the source of the transmission/traffic) that excessive latency has been encountered in the transport network, but may further advise that the traffic or the transmission may continue to be sent at a desired rate (since the traffic can now be diverted to the one or more storage resources of the SAN). The traffic may be cached in the at least one storage resource that is assigned to the transmission and then sent to the destination from the at least one storage resource. Receipt of the traffic may be acknowledged by the at least one storage resource to the source device, thereby maintaining compliance with the latency requirement from the perspective of the source device. If the latency along the assigned route returns to an acceptable level, the controller may notify the SAN coordinator, and the caching of the traffic may be stopped.

Alternatively, or in addition, the controller may assign a new route to the transmission that satisfies the latency requirement. The controller may then notify the SAN coordinator that caching is no longer necessary when the new route is set up. In this example, the controller may also provide information regarding the new route, such as the transport nodes in the route, to the SAN coordinator such that the SAN coordinator may select a new set of one or more storage resources for the transmission. For instance, due to changes in the locations of the transport nodes, there may be different storage resources that are better suited to support the transmission along the new route. In one example, at least one storage resource may be provisionally allocated to a transmission if the controller advises that it has found an initial route that meets the latency requirements of the transmission. However, the at least one storage resource may be fully allocated by the SAN coordinator if the controller advises that it is not able to allocate an initial route of transport nodes and links that meet the latency requirement.

Supporting latency sensitive applications in a stochastic network environment may be challenging, especially over long distances. Virtualizing the latency experienced by a transmission in a cloud transport environment using software defined storage, e.g., a virtual storage area network (SAN), in accordance with the present disclosure is a scalable, cost effective solution for addressing the requirements of such applications. For instance, a synchronous data mirroring application is one such latency sensitive application that may be served by examples of the present disclosure. In synchronous data mirroring, a source device sends traffic to a destination, the destination acknowledges receipt of the traffic, and the source continues to send additional traffic in response to receiving the acknowledgement. If no acknowledgment is received, or is not received within the latency requirement, the source may stop sending new traffic. For example, if the latency along the route of the transmission is excessive, acknowledgment messages may not be received before the source device times-out. Thus, the experience of essentially real-time data mirroring is degraded, or the application may simply stop functioning or return an error condition. By utilizing at least one storage resource of a SAN when the latency is excessive, the transmission can be acknowledged from the at least one storage resource to the source device, thereby maintaining the appearance that the latency is compliant with the latency requirement, and thereby allowing the source device to continue to transmit at a desired rate. The traffic may then be sent from the storage resource(s) to the destination device. Thus, the latency is "virtualized" insofar as the latency, from the point of view of the source device, remains compliant with the latency requirement. These and other aspects of the present disclosure are discussed in greater detail below in connection with the examples of FIGS. 1-5.

To aid in understanding the present disclosure, FIG. 1 illustrates a block diagram depicting one example of a network, or system 100 suitable for performing or enabling the steps, functions, operations and/or features described herein. The overall communications system 100 may include any number of interconnected networks which may use the same or different communication technologies, such as a traditional circuit switched network (e.g., a public switched telephone network (PSTN)) or a packet network such as an Internet Protocol (IP) network (e.g., an IP Multimedia Subsystem (IMS) network), a multi-protocol label switching (MPLS network), a frame relay network, an asynchronous transfer mode (ATM) network, a wireless network, a cellular network (e.g., 2G, 3G, and the like), a long term evolution (LTE) network, and so forth. It should be noted that an IP network is broadly defined as a network that uses Internet Protocol to exchange data packets.

As illustrated in FIG. 1, a network portion 105 of system 100 may include a transport network 150 and a storage area network (SAN) 190. In one embodiment, the transport network 150, broadly a "communications network," may be in communication with one or more access networks 120 and 130. The access networks 120 and 130 may include a wireless access network (e.g., an IEEE 802.11/Wi-Fi network and the like), a cellular access network, a PSTN access network, a cable access network, a digital subscriber line (DSL) network, a metropolitan area network (MAN), other types of wired access networks, an Internet service provider (ISP) network, and the like. In one example, the access networks 120 and 130 may be different types of access networks. In another example, the access networks 120 and 130 may be the same type of access network.

In one example, the transport network 150 may be operated by a telecommunications service provider. In addition, in one example, the storage area network 190 may be operated by a same entity as the transport network 150. For instance, the network portion 105 may comprise an integrated telecommunications service provider network. However, in another example, the storage area network 190 may be operated by a different entity than an entity operating transport network 150. For instance, storage area network 190 may comprise infrastructure of a cloud storage provider. In one example, the network portion 105, the transport network 150, the storage area network 190, and/or the access networks 120 and 130 may be operated by different entities, a same entity, or a combination thereof. However, in another example, access networks 120 and 130 may be operated by one or more entities having core businesses that are not related to telecommunications services. For instance, access networks 120 and 130 may also represent corporate, governmental or educational institution LANs, a home/residential LAN, and the like.

In one example, access networks 120 and 130 may transmit and receive communications between devices 121 and 131 and transport network 150 relating to voice telephone calls, data communications and so forth. Although two access networks 120 and 130 and two devices 121 and 131 are illustrated in FIG. 1, it should be understood that any number of access networks and devices may connect to the transport network 150. In one example, devices 121 and 131 may each comprise a mobile device, a cellular smart phone, a laptop computer, a tablet computer, a desktop computer, a smart television, a server, a cluster of such devices, and the like. Either or both of endpoint devices 121 and 131 may also comprise a wearable device, such as a smart watch, a networked fitness monitor, and the like.

As illustrated in FIG. 1, transport network 150 includes a controller 151 and a number of transport nodes 155-159. In one example, transport network 150 may comprise, at least in part, a software defined network (SDN). For instance, components of the SDN may comprise cloud computing resources that may comprise virtual machines operating on one or more host devices in one or more data centers. Thus, in one example, controller 151 may comprise an SDN controller that is responsible for such functions as provisioning and releasing instantiations of transport nodes 155-159, configuring the transport nodes 155-159 to perform the functions of routers, switches, and other devices, provisioning routing tables and other operating parameters for the transport nodes 155-159, and so forth. In one example, controller 151 may maintain control plane communications with transport nodes 155-159 via control links 160 to orchestrate operations of the various transport nodes 155-159 to function as a communications network, e.g., a transport network. In one example, control links 160 may comprise secure tunnels for signaling communications over an underling IP infrastructure of transport network 150, storage area network 190, and/or network portion 105. In other words, control links 160 may comprise virtual links multiplexed with transmission traffic and other data traversing network portion 105 and carried over a shared set of physical links. For ease of illustration, some of the control links 160 are omitted from FIG. 1. Controller 151 may be collocated with one or more of the transport nodes 155-159, or may be deployed at a different physical location. The controller 151 may also comprise a virtual machine operating on a host device, or may comprise a dedicated device. In one example, the controller 151 may comprise a computing system or server, such as computing system 400 depicted in FIG. 4, and may be configured to provide one or more functions for caching traffic of a transmission in a storage resource of a storage area network when a route for the transmission does not satisfy a latency requirement, as described herein.

In one example, controller 151 may configure a route 170 comprising transport nodes, links between various transport nodes in the transport network 150, and links to external networks, e.g., access networks 120 and 130. To illustrate, transport network 150 may comprise an IP/MPLS network where transport nodes 155-159 may comprise label-switched routers. Device 121 may send a notification to the controller 151 that it has a transmission for device 131. The notification may be received by transport node 156, e.g., functioning as a provider edge (PE) router, via access network 120. Transport node 156 may forward the notification to the controller 151. Device 121 may include parameters for the transmission in the notification, such as: a size of the transmission, or an anticipated duration of the transmission, a bandwidth requirement, a latency requirement, a security requirement (e.g., no links or transport nodes in country "X," no less than advanced encryption standard (AES)-256 encryption), and so forth. In one example, controller 151 may then configure a label-switched path through the transport network 150 that may satisfy all or a portion of the parameters for the transmission requested by device 121. In the example of FIG. 1, route 170, including transport nodes 156, 157 and 158, may be selected as the label-switched path. As such, MPLS forwarding tables of transport nodes 156, 157 and 158 may be provisioned by the controller 151 to support route 170 by communicating with the transport nodes 156, 157 and 158 via control links 160. Device 121 may begin sending packets to the transport network 150 via access network 120. The packets may initially be received in the transport network 150 by transport node 156, which may add a label and/or encapsulate the packet for label-switched routing along the route 170 towards access network 130 and the destination, device 131.

For illustrative purposes, the foregoing example, and other examples herein, may be described with respect to IP packets over MPLS. However, as mentioned above, the present disclosure is equally applicable to other types of data units and transport protocols, such as frame relay, and ATM. In addition, in various examples the present disclosure relates to switched virtual circuits (SVCs), e.g., where a route is set up and released on a per-call or per-transmission basis. However, examples of the present disclosure may also include permanent virtual circuits (PVCs), where a route may be utilized for more than one transmission and where the route may exist for a longer duration of time.

In accordance with the present disclosure, the controller 151 may also provision at least one storage resource in storage area network 190 for the transmission from device 121 to device 131. For example, controller 151 may use a control link 160 to send a request to the coordinator 191 of storage area network 190 for at least one storage resource to be assigned to the transmission. As illustrated in FIG. 1, the storage area network 190 includes storage resources 197-199. In one example, storage resources 197-199 may comprise cloud computing resources that may comprise virtual machines operating on one or more host devices in one or more data centers. In one example, storage resources 197-199 and storage network 190 may share physical cloud computing resources with and/or be collocated with components of transport network 150. In another example, storage area network 190 and storage resources 197-199 may comprise a different set of physical devices, e.g., in an entirely different data center or set of data centers from components of transport network 150. In one example, where the storage resources 197-199 comprise virtual machines, the underlying host devices may comprise devices that are designed and/or optimized for storage services, e.g., as opposed to generic cloud computing resources that are reconfigurable as any number of types of virtual machines. Each of the storage resources 197-199 may be hosted on individual, physical host devices, or may be distributed across one or more physical host devices. For instance, each of the storage resources 197-199 may comprise one or more virtual storage volumes that may logically be addressed as a single storage device, but which may span one or more blocks of various physical storage media that may reside on different physical devices in a same data center, or in different data centers.

Figure 4:
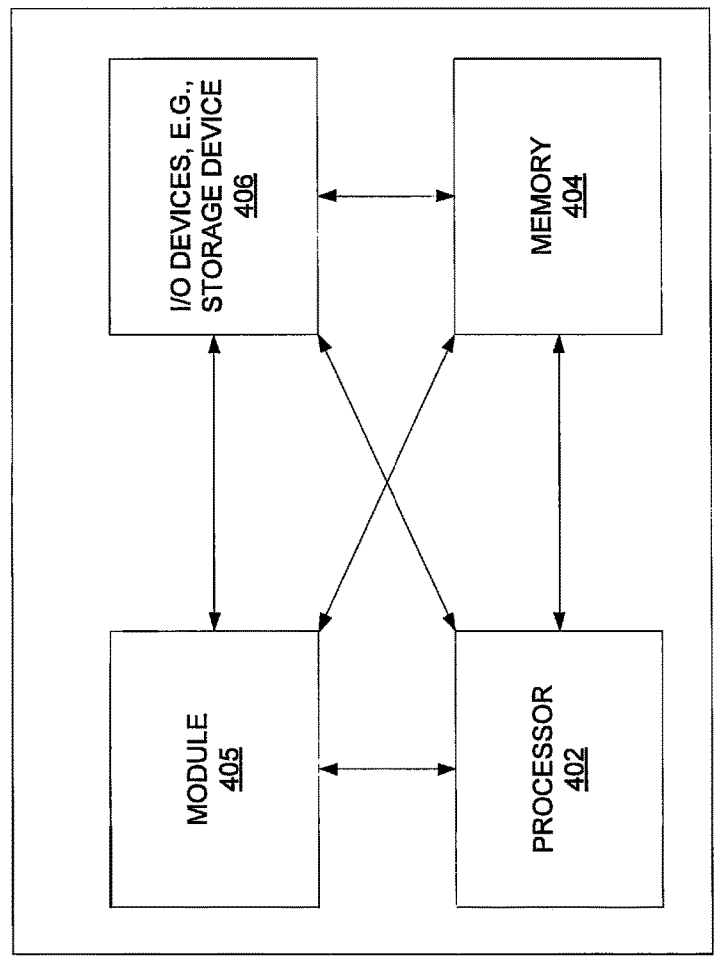
FIG. 4 illustrates an example high-level block diagram of a computer specifically programmed to perform the steps, functions, blocks, and/or operations described herein.

The coordinator 191 may comprise a computing system or server, such as computing system 400 depicted in FIG. 4, and may be configured to provide one or more functions for caching traffic of a transmission in a storage resource of a storage area network when a route for the transmission does not satisfy a latency requirement, as described herein. In one example, the coordinator 191 may also comprise a virtual machine operating on a host device, or may be a dedicated device. In one example, the coordinator 191 may be responsible for instantiating and releasing storage resources 197-199, e.g., where storage resources 197-199 comprise virtual resources. In one example, the coordinator 191 may comprise a virtual SAN hypervisor, or orchestrator for receiving requests for storage resources from various requestors and assigning storage resources of the SAN 190. In one example, coordinator 191 also maintains control plane communications with storage resources 197-199 via control links 160.

In one example, coordinator 191 may manage assignments of storage resources of storage area network 190 to different transmissions traversing transport network 150. For instance, coordinator 191 may receive a request for one or more storage resources from controller 151 relating to a transmission from device 121 to device 131 over route 170. In one example, the request may identify various parameters, such as the source (e.g., device 121), the destination (e.g., device 131), the route 170, including transport nodes 156, 157 and 158 in the transport network 150, a bandwidth requirement, a latency requirement, a security requirement, a size or a duration of the transmission and/or a duration of the request for the one or more storage resources, a requested size (volume) of the storage resource, a number of storage resources requested, and so forth. The request may comprise a particular number of storage resources requested, or may comprise a general request, where the coordinator 191 is tasked with determining an appropriate number of storage resources, such as based upon the received parameters, a current availability of storage resources and the locations of such storage resources, and so forth.

In one example, the coordinator 191 may determine and assign at least one storage resource that satisfies the parameter(s) for the transmission. For example, the coordinator 191 may determine that storage resource 197 is closest to or has the shortest path routing to one or more components of the route 170 and that the storage resource 197 has sufficient storage capacity based upon the parameters received from the controller 151. Therefore, coordinator 191 may assign storage resource 197 to the transmission and notify controller 151, e.g., via control links 160. In one example, the assignment of storage resource 197 may comprise instantiating storage resource 197 as a virtual machine or storage volume on one or more underlying host devices. In one example, coordinator 191 may provide an address, a uniform resource location (URL), a pointer, a link, or other identifier of the storage resource 197 to the controller 151. Controller 151 may provide the identifier of the storage resource 197 to one, several, or all of the transport nodes in the route 170, e.g., transport nodes 156, 157 and 158. However, in another example, the transport nodes 155-159 in the transport network 150 may simply have access to the storage area network 190, e.g., via links 175, where the storage area network 190 may handle forwarding packets from the transport network 150 to the appropriate storage resource(s) based upon an identification of the transmission to which the traffic belongs. For instance, a label of the transmission and/or of the route 170 may be used by the components of the storage area network 190 to identify the transmission and route the traffic to the allocated storage resource(s). Thus, in various examples, devices outside of the storage area network 190 do not need to keep track of the physical location of traffic that may be cached in a storage resource of the storage area network 190. Rather, mapping of the traffic/data to a physical device may be handled by the coordinator 191 and/or other components of the storage area network 190.

In one example, a storage resource may be assigned to a particular transport node, or multiple transport nodes, of a route for a transmission. In another example, different storage resources may be assigned to different transport nodes of a route of a transmission. For example, a first storage resource near a first transport node may be assigned for use by the first transport node while a second storage resource closer to a second transport node may be assigned for use by the second transport node. To illustrate, coordinator 191 may assign storage resource 197 to transport node 156 and may assign storage resource 199 to transport node 158 in connection with the transmission along route 170. In this regard, it should be noted that not all transport nodes in a selected route are necessarily provided with access to a storage resource or are configured to forward traffic to a storage resource, e.g., when there is excessive latency along the route. For instance, a transport node approximately halfway along a route, e.g., transport node 157 on route 170, may be configured by the controller 151 as a primary point where traffic may be diverted to the storage area network 190 in response to an excessive latency. Another transport node closer to the source or the destination, e.g., transport node 156, may be selected as a secondary point where traffic may be diverted to the storage area network 190. For example, if there is a problem with the primary point, the secondary point may be used to divert the traffic to at least one storage resources of the storage area network 190.

To illustrate, route 170 may be established for a transmission from device 121 to device 130. In addition, storage resource 197 may be assigned to transport node 156 and storage resource 199 assigned to transport node 158. Device 121 may then send traffic of the transmission to device 131. At some time, congestion may occur on the link between transport nodes 157 and 158, which may cause a rerouting, e.g., from transport node 157 to transport node 155 to transport node 158. For instance, the rerouting may be implemented automatically in transport network 150 based upon a link congestion protection scheme. However, the rerouting may cause a latency to exceed a latency requirement for the transmission. In one example, the latency may be measured by the source, device 121, the destination, device 131, or by a transport node along the route 170, e.g., transport node 156. The latency that is measured may then be reported to controller 151 via a control link 160 periodically, when the latency exceeds the latency requirement, in response to a poll from the controller 151, and so forth. In any event, when the latency exceeds the latency requirement, the controller 151 may then instruct one or more of the transport nodes along the route 170 to divert the traffic. To illustrate, controller 151 may instruct transport node 156 to divert the traffic to storage resource 197. For instance, the primary contributor to the excessive latency may be the portion of route 170 between transport nodes 157 and 158. Therefore, it is more likely that the latency will remain excessive if traffic were to be diverted to storage resource 199 from transport node 158. Thus, traffic may be cached in storage resource 197 via one of the links 175. The storage resource 197 may acknowledge receiving the traffic via the link 175. As such, device 121 may continue to send traffic of the transmission at a desired rate, and it will appear to device 121 that the latency requirement for the transmission continues to be satisfied. The storage resource 197 may also forward the traffic to the destination, device 131, in several different ways, e.g., via a different route, via a same route at a later time, and so forth.

In one example, the controller 151 and/or the storage resource 197 may also inform the coordinator 191 that the traffic is being diverted to the storage resource 197. For example, the storage resource 197 may be assigned to several different transmissions, and one of which may utilize the storage resource in response to a latency condition. In one example, when one transmission actually utilizes the storage resource to cache traffic, the controller 151 may then re-assign the other transmissions to at least one different storage resource that is available for use, but which is not actively being used to cache traffic for a transmission experiencing latency issues.

The controller 151 may continue to monitor the latency of route 170 via control links 160 connecting the controller 151 to various transport nodes in transport network 150. If the latency returns to a satisfactory level, the controller 151 may signal to transport node 156 to stop caching the traffic in storage area network 190. Alternatively, or in addition, the controller 151 may reassign the transmission to a different route that satisfies the latency requirement and signal the involved transport nodes that caching in the storage area network 190 should stop and that a different set of transport nodes should now carry the traffic. For instance, the controller 151 may send instructions to reconfigure the label-switched routing tables of one or more of the transport nodes in the transport network 150. In one example, the controller 151 may also notify the SAN coordinator 191 via a control link 160 that the route has been reassigned. The SAN coordinator 191 may then assign at least one different storage resource that may be better matched to the new route in terms of proximity, routing cost, security, etc. Finally, when the transmission has concluded, the controller 151 may signal to the coordinator 191 that the storage resource(s) assigned to the transmission may be released and or reassigned for other traffic or for other purposes.

It should be noted that the system 100 has been simplified. In other words, the system 100 may be implemented in a different form than that illustrated in FIG. 1. For example, the system 100 may be expanded to include other network elements (not shown) such as border elements, routers, switches, policy servers, security devices, gateways, a content distribution network (CDN) and the like, without altering the scope of the present disclosure. Similarly, system 100 may omit various elements, substitute elements for devices that perform the same or similar functions and/or combine elements that are illustrated as separate devices. For example, access networks 120 and 130 may be omitted. For instance, a source and a destination for a transmission may be considered to be provider edge routers in the transport network 150. In another example, controller 151 and coordinator 191 may be integrated into a single device. In still another example, controller 151 and/or coordinator 191 may comprise functions that are spread across several devices that operate collectively as a controller or coordinator, respectively. Thus, these and other modifications of the system 100 are all contemplated within the scope of the present disclosure.

Figure 2:
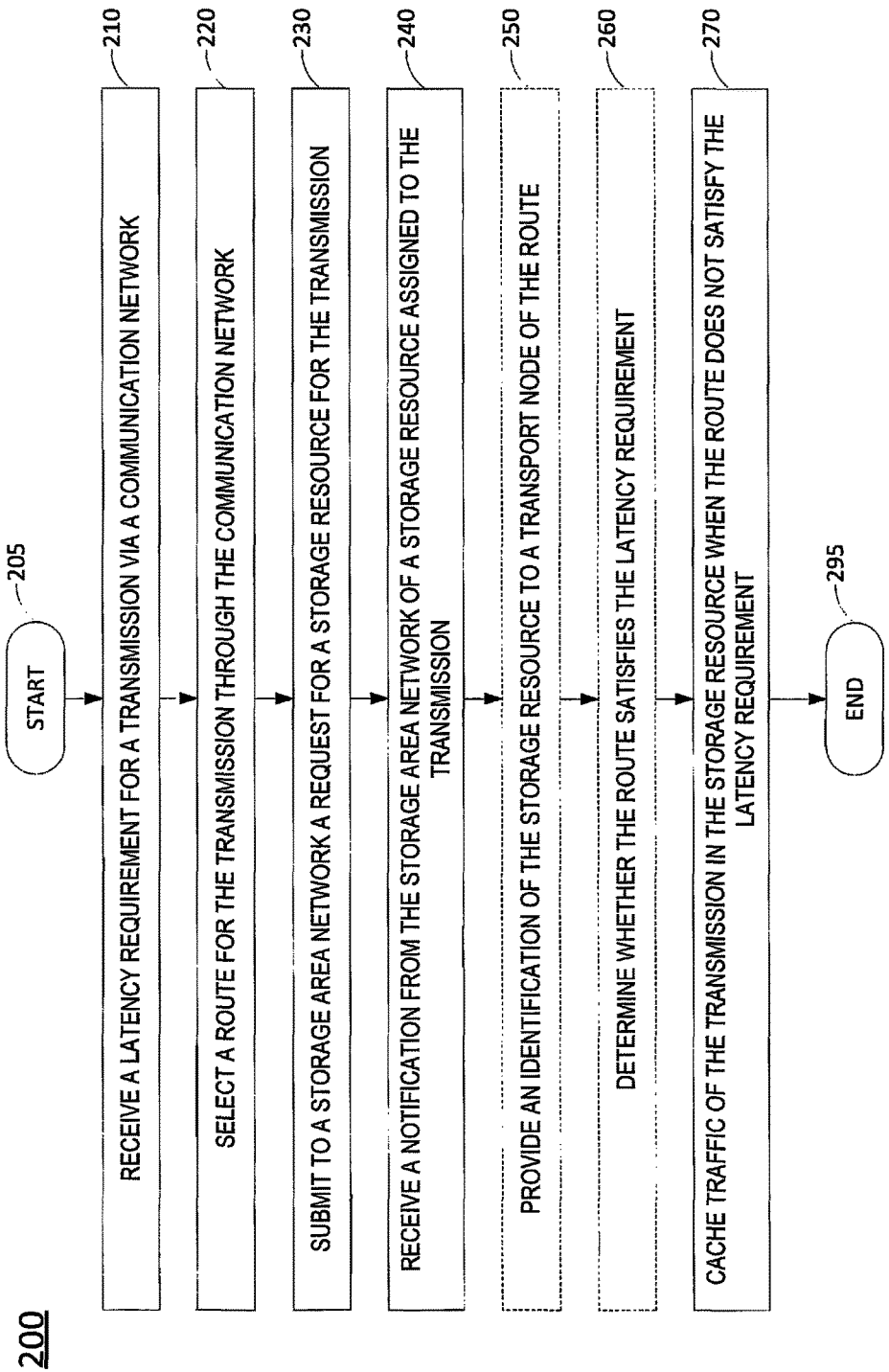
FIG. 2 illustrates a flowchart of an example method for caching traffic of a transmission in a storage resource of a storage area network when a route for the transmission does not satisfy a latency requirement, in accordance with the present disclosure.

FIG. 2 illustrates a flowchart of an example method 200 for caching traffic of a transmission in a storage resource of a storage area network when a route for the transmission does not satisfy a latency requirement, in accordance with the present disclosure. In one example, steps, functions and/or operations of the method 200 may be performed by a network-based device, e.g., controller 151 in FIG. 1, or controller 151 in conjunction with other components of the system 100. In one example, the steps, functions, or operations of method 200 may be performed by a computing device or system 400, and/or processor 402 as described in connection with FIG. 4 below. For illustrative purposes, the method 200 is described in greater detail below in connection with an example performed by a processor, such as processor 402. The method begins in step 205 and proceeds to step 210.

At step 210, the processor receives a latency requirement for a transmission via a communications network. For example, a source device, or an application of the source device, may have packets or other data units to transmit from the source device to a destination via a communications network, e.g., a transport network. Thus, the processor may receive from the source device a notification of an intended transmission. The notification may include an identification of a destination, and other parameters, such as: a latency requirement, a bandwidth requirement, a recovery point objective (RPO), a recovery time objective (RTO), various other quality of service (QoS) requirements, a security requirement, and so forth. For example, certain applications such as streaming video, synchronous storage or data mirroring, and other applications may suffer from performance limitations or errors if there is excessive network latency. In one example, the destination may be identified as a particular destination device, or may be identified by a URL, a hostname, a session initiation protocol (SIP) address, an International Mobile Subscriber Identity (IMSI), an IP address, and so forth, where the processor or other network-based component is tasked with resolving the destination identifier into a physical destination device.

At step 220, the processor selects a route for the transmission through the communications network. In one example, the processor initially selects a route comprising transport nodes and links in the communications network such that the latency requirement and/or other parameters of the transmission are met. However, in another example, the processor may be unable to secure a route that initially satisfies the latency requirement and/or the other parameters. Thus, the processor may assign a route that is the most closely able to satisfy parameters of the transmission, or may notify the source device to revise the parameters requested in the notification of the transmission. In one example, the selecting the route for the transmission may include instantiating at least one transport node, e.g., a router, in the communications network that is included in the route. For instance, the communications network may comprise a software defined network (SDN), where the processor may comprise a processor of an SDN controller, and where some or all of the functional components of the communications network may comprise virtual machines running on host devices.

In one example, the processor may further configure routing tables and/or other operational aspects of one or more transport nodes to support the route. For instance, the communications network may comprise an IP/MPLS network where transport nodes may comprise label-switched routers. Thus, the route may be assigned a label, and MPLS routing tables updated in the transport nodes to forward packets or other data units of the transmission along the route that is configured. For example, the processor may send management/control communications to the transport nodes and/or advertise the new route such that the routing tables are updated accordingly.

At step 230, the processor submits to a storage area network a request for a storage resource for the transmission. For example, the processor may forward various parameters for the transmission to a coordinator of the storage area network in a request seeking assignment/allocation of at least one storage resource to the transmission. The coordinator may then reserve or assign at least one storage resource from a shared pool of storage resources of the storage area network to the transmission. The parameters may include an identification of the source, the destination, a bandwidth requirement, a latency requirement, an RTO requirement, an RPO requirement, a requested storage amount, a number of storage resources requested, the nodes and links in the communications network comprising the route, a security requirement, and so forth. Thus, the coordinator may be able to select storage resources that are closest to the route selected by the processor at step 220, or which are optimized based upon any other criteria in view of the parameters provided by the processor in the request submitted at step 230.

At step 240, the processor receives a notification from the storage area network of a storage resource assigned to the transmission. For instance, a coordinator of the storage area network may allocate at least one storage resource to the transmission in response to receiving the request sent by the processor at step 230 and send a notification to the processor of the at least one storage resource that is assigned. In one example, the at least one storage resource is assigned based upon the parameters included in the request sent at step 230, e.g., based upon the latency requirement, based upon the locations of transport nodes in the route, and so forth. For instance, a path between the source device and the storage resource through the communications network and the storage area network should also satisfy the latency requirement. In one example, the notification may include at least one identifier of the at least one storage resource, e.g., a URL, a hostname, an IP address, and so forth, such that the transport nodes assigned to the transmission in the communications network can divert traffic to the at least one storage resource.

In one example, different storage resources may be allocated for different transport nodes in the route. For instance, a first storage resource near a first transport node may be assigned for use by the first transport node while a second storage resource closer to a second transport node may be assigned for use by the second transport node. In one example, a storage resource that is assigned to the transmission may also be allocated to at least one additional transmission. For instance, the storage resource may remain unused at the time the notification is received at step 240, and remain available for use by any one of the transmissions allocated to the storage resource. However, in another example, the storage resource may be exclusively allocated to the transmission. For instance, the processor may have been unable to select a route for the transmission at step 220 meeting the parameters of the transmission. For instance, there may have been no route available that would initially satisfy the latency requirements. Therefore, the storage resource may be ready for actual use for the transmission as soon as the transmission begins.

At optional step 250, the processor provides an identification of the storage resource to a transport node of the route. For example, as mentioned above, the notification received at step 240 may include an identification of the storage resource that is assigned to the transmission. Thus, at optional step 250, the processor may provide the identification of the storage resource to at least one transport node in the route. For instance, the processor may configure a primary point to divert traffic of the transmission to the storage area network. The processor may also configure a secondary point or multiple backup points for diverting the traffic to the storage area network.

At optional step 260, the processor determines whether the route satisfies the latency requirement. For example, the processor may monitor the transmission on the route for compliance with the latency requirement and other parameters. However, since the transport network is subject to disruptions, it is possible that the performance of the route may degrade such that it is no longer able to meet the latency requirement. For instance, a latency can fail to meet a latency requirement due to a number of issues, such as a failure of a link, congestion on a link, a failure of a transport node, congestion at the transport node, a problem at a destination device or in an access network utilized by the destination device, and so forth. In one example, the source and/or the destination may notify the processor if the latency exceeds a latency requirement. For instance, the source device may time stamp a packet and the destination may send an acknowledgement of receiving the packet. The source may then determine a round-trip time inclusive of sending the packet and receiving the acknowledgement. If the round-trip time, e.g., the latency, exceeds the latency requirement, the source device may therefore inform the processor. In another example, the processor may poll transport nodes, e.g., routers, along the route to determine a latency. For instance, the transport nodes may periodically send probe packets along the route to determine a latency of the route. In one example, the probe packets may be sent by the first transport node in the communications network closest to the source device along the route. In another example, the latency may be determined by the destination based upon a time to receive a packet from the source, where the processor is notified of excessive latency by the destination.

At step 270, the processor caches traffic of the transmission in the storage resource when the route does not satisfy the latency requirement. The caching of traffic at step 270 may begin at the inception of the transmission, or may begin at a later time, e.g., in response to determining that the route no longer satisfies a latency requirement at optional step 260. In one example, the processor may advise a coordinator of the storage area network that traffic of the transmission will be diverted to the storage resource. In one example, the processor may send instructions to a primary point, e.g., one of the transport nodes in the route, to being diverting the traffic to the storage resource. In one example, if the primary point is unable to divert the traffic or diverting traffic from the primary point is unfeasible for any reason, the processor may send instructions to a backup point to begin diverting traffic to the storage resource (or to a different storage resource). The traffic may thus be cached in a storage resource that is assigned to the transmission and then sent to the destination from the one or more storage resources. The storage resource may acknowledge receipt of the traffic to the source device. Thus, from the perspective of the source device, the latency requirement of the transmission may remain fulfilled and the source device may continue to send traffic towards the destination at a desired rate.

Following step 270, the method 200 may proceed to step 295. At step 295, the method 200 ends.

It should be noted that following step 260, the processor may continue to monitor the route to determine if a latency again satisfies a latency requirement. For instance, conditions along the route may change after some time such that the route is again able to comply with the latency requirement. Thus, the processor may instruct a transport node to stop caching traffic in the storage resource and to again send traffic of the transmission along the original route when conditions improve on the route. In another example, the processor may assign a new route, or the transmission may be automatically rerouted to a backup route in response to determining that the route does not satisfy the latency requirement at optional step 250. For instance, the processor may temporarily cache the traffic in the storage resource at step 260 while the new/backup route is activated, after which it is no longer necessary to cache the traffic in the storage resource. Thus, the processor may instruct a transport node to stop caching traffic in the storage resource and configure various transport nodes in the network to instead send traffic of the transmission along the new/backup route.

Figure 3:
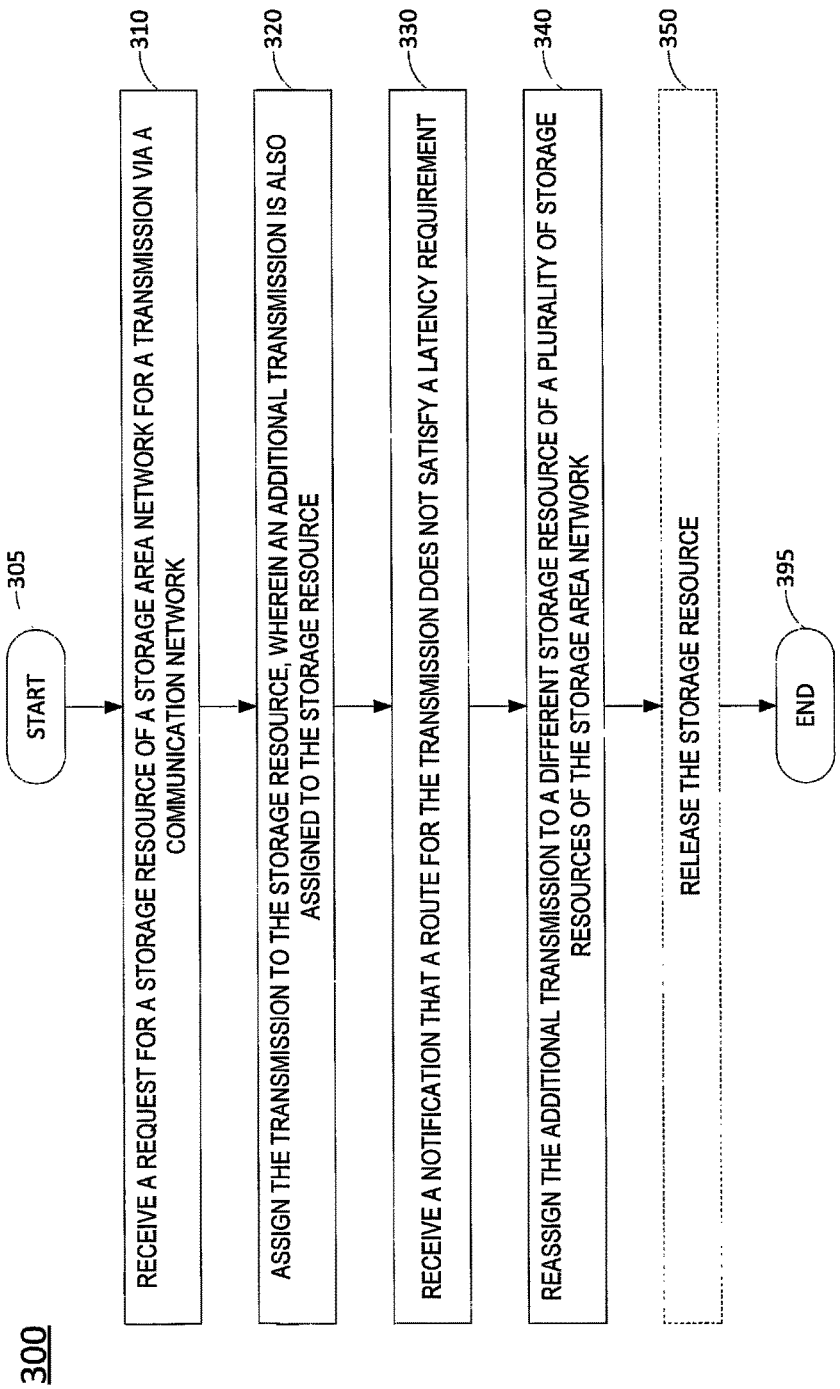
FIG. 3 illustrates a flowchart of an additional example method for caching traffic of a transmission in a storage resource of a storage area network when a route for the transmission does not satisfy a latency requirement, in accordance with the present disclosure.

FIG. 3 illustrates a flowchart of an additional example method 300 for caching traffic of a transmission in a storage resource of a storage area network when a route for the transmission does not satisfy a latency requirement, in accordance with the present disclosure. In one example, steps, functions and/or operations of the method 300 may be performed by a network-based device, e.g., coordinator 191 in FIG. 1, or coordinator 191 in conjunction with other components of the system 100. In one example, the steps, functions, or operations of method 300 may be performed by a computing device or system 400, and/or processor 402 as described in connection with FIG. 4 below. For illustrative purposes, the method 300 is described in greater detail below in connection with an example performed by a processor, such as processor 402. The method begins in step 305 and proceeds to step 310.

At step 310, the processor receives a request for a storage resource of a storage area network for a transmission via a communications network. For example, a source device, or an application of the source device, may have packets or other data units to transmit from the source device to a destination via a communications network, e.g., a transport network. A controller in the communications network may select a route for the transmission comprising transport nodes and links in the communications network and seek to reserve one or more storage resources of the storage area network for the transmission. Thus, in one example the processor may receive the request at step 210 from the controller. The request may include an identification of a source, a destination, transport nodes included in the route selected for the transmission, and other parameters, such as: a bandwidth requirement, a latency requirement, a recovery point objective (RPO), a recovery time objective (RTO), various other quality of service (QoS) requirements, a security requirement, and so forth. In one example, the identification of transport nodes in the route includes an identification of a primary point for diverting traffic. In one example, one or more secondary/backup points are also identified for diverting traffic in the event the primary point is not available or is unable to divert traffic in compliance with the latency requirement. In one example, the primary and/or secondary points may comprise recommendations for the processor. In other words, the processor may attempt to satisfy the preferences, but may implement a different configuration, e.g., based upon the physical locations of available storage resources, and other criteria.

At step 320, the processor assigns the transmission to a storage resource. For instance, the processor may reserve or assign at least one storage resource from a shared pool of storage resources of the storage area network to the transmission. The processor may select storage resources that are closest to a route for the transmission, or which are optimized based upon any other criteria in view of the parameters received at step 310. For example, the storage resource assigned at step 320 may be selected such that a path between the source device and the storage resource through the communications network and the storage area network satisfies a latency requirement. In one example, the storage resource may be allocated for use by a transport node that comprises a primary point to divert traffic to the storage area network. In one example, the storage resource may be allocated such that the storage resource is approximately halfway between the source and the destination along the route.

In one example, a first storage resource proximate a first transport node may be assigned for use by the first transport node while a second storage resource proximate to a second transport node (e.g., closer to the second transport node than the first transport node in terms of physical distance, routing distance or time, etc.) may be assigned for use by the second transport node. In one example, the assigning the transmission to a storage resource at step 320 may include generating or instantiating the storage resource, e.g., as a virtual machine or storage volume on one or more underlying host devices. In one example, an additional transmission is also assigned to the storage resource. For instance, the storage resource may not be exclusively assigned to the transmission, but may be assigned/allocated to a number of transmissions utilizing various routes in the communications network. For example, the processor may set aside a storage resource or may make a notation that a storage resource may be required for the transmission. The storage resource could be provisionally available to other transmissions that may also have a use for the storage resource. In other words, the various storage resources of the storage area network may comprise a caching pool of storage resources that cover a plurality of different transmissions. As such, a storage resource may not be exclusively allocated to the transmission unless and until actually needed by the transmission, e.g., when a latency requirement is not met. In addition, while a plurality of storage resources may be assigned to a first transmission, a different plurality of storage resources may be assigned to a second transmission. However, at least one storage resource may be allocated to both transmissions.

At step 330, the processor receives a notification that the route for the transmission does not satisfy the latency requirement. In one example, the notification may be received from a controller of the communications network. Accordingly, the processor may forward the notification or generate a separate alert to the storage resource that it should prepare to receive and cache traffic of the transmission. In another example, the notification may be received from the storage resource that is assigned to the transmission. For instance, a transport node of the route for the transmission may simply begin diverting traffic to the storage resource for caching when there is excessive latency on the route. The traffic may be cached in the storage resource that is assigned to the transmission and then sent to the destination from the storage resource. The storage resource may also acknowledge receipt of the traffic to the source. Thus, from the perspective of the source, the latency requirement of the transmission may remain fulfilled and the source may continue to send traffic towards the destination at a desired rate.

At step 340, the processor reassigns the additional transmission to a different storage resource of a plurality of storage resources of the storage area network. In particular, since the traffic of the transmission is being cached in the storage resource, the storage resource may no longer be able to cache traffic for the additional transmission. Thus, if the additional transmission were to also experience latency issues, it would have a different storage resource allocated and available for use. In one example, step 340 may comprise similar operations to those discussed above in connection with step 320. For instance, the different storage resource may be assigned to the additional transmission, and in some cases to one or more other transmissions.

At optional step 350, the processor releases the storage resource when the storage resource is no longer required for the transmission. For example, the processor may receive a notification from the controller when the transmission has concluded. Thus, the processor may release and/or reassign the storage resource(s) allocated to the transmission for other transmissions or for other purposes. For instance, a virtual machine or storage volume operating on a host device may be torn down, and the physical resources may be reconfigured as a different virtual machine or storage volume, or remain unused. In another example, the storage resource may be reassigned to one or more additional transmissions, or may remain assigned or allocated to one or more additional transmissions that were previously assigned to the storage volume at the same time as the transmission that has ended. In still another example, the transmission may be rerouted in the communications network and the processor may allocate a different storage resource to the transmission based upon the new route. As such, the processor may release the previously assigned storage resource at optional step 350.

Following step 340 or optional step 350, the method 300 may proceed to step 395. At step 395, the method 300 ends.

It should be noted that although not specifically specified, one or more steps, functions or operations of the respective methods 200 and 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 or FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the example embodiments of the present disclosure.

As such, the present disclosure provides at least one advancement in the technical field of communications network latency management. For instance, examples of the present disclosure include network-based servers for caching traffic of a transmission in a storage resource of a storage area network when a route for the transmission does not satisfy a latency requirement. For instance, in one example of the present disclosure a network-based server may select a route for a transmission based upon latency requirement of the transmission. The processor may also provision a storage resource, or storage resources, from a storage area network based upon the latency requirement and/or other parameters of the transmission, where the storage resources may be assigned to cache traffic of the transmission when latency is excessive along the selected route. In another example, a network-based server may receive a request for a storage resource for a transmission and select a storage resource from a storage area network based upon one or more parameters of the transmission, e.g., including a latency requirement. For instance, the storage resource may be made available to cache traffic of the transmission when latency is excessive along the selected route. The storage resource may also be allocated to a plurality of transmissions, remaining unused unless and until one of the transmissions experiences excessive latency along an assigned route. In addition, embodiments of the present disclosure improve the functioning of a computing device, e.g., a server. Namely, servers dedicated to managing latency of a transmission are improved in the example of the present disclosure, e.g., a controller and/or a coordinator as described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for caching traffic of a transmission in a storage resource of a storage area network when a route for the transmission does not satisfy a latency requirement, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or method 300, or the entire method 200 or method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one embodiment, instructions and data for the present module or process 405 caching traffic of a transmission in a storage resource of a storage area network when a route for the transmission does not satisfy a latency requirement (e.g., a software program comprising computer-executable instructions) can be loaded into memory 404 and executed by hardware processor element 402 to implement the steps, functions or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for caching traffic of a transmission in a storage resource of a storage area network when a route for the transmission does not satisfy a latency requirement (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
    receiving, by a processor, a latency requirement for a transmission via a communications network between a source device and a destination device;
    selecting, by the processor, a route for the transmission through the communications network between the source device and the destination device;
    submitting, by the processor to a storage area network, a request for a storage resource for the transmission, wherein the storage area network is distinct from the source device and the destination device;
    receiving, by the processor from the storage area network, a notification of a storage resource of the storage area network assigned to the transmission; and
    caching, by the processor, traffic of the transmission in the storage resource when the route fails to satisfy the latency requirement.

2. The method of claim 1, wherein the submitting the request for the storage resource to the storage area network comprises:
    providing at least one parameter for the transmission to a coordinator device of the storage area network, wherein the coordinator device selects the storage resource from a plurality of storage resources of the storage area network for assigning to the transmission based upon the at least one parameter.

3. The method of claim 2, wherein the storage resource is assigned to the transmission and to at least one additional transmission.

4. The method of claim 2, wherein the at least one parameter comprises the latency requirement.

5. The method of claim 1, wherein the route for the transmission satisfies the latency requirement when the route is selected.

6. The method of claim 1, wherein the receiving the latency requirement comprises receiving a plurality of parameters for the transmission, the plurality of parameters including the latency requirement, wherein the route that is selected for the transmission satisfies the plurality of parameters.

7. The method of claim 1, further comprising:
    determining whether the route satisfies the latency requirement.

8. The method of claim 7, wherein the determining whether the route satisfies the latency requirement comprises polling a transport node of the route.

9. The method of claim 1, wherein the caching the traffic of the transmission in the storage resource comprises:
    sending a notification to the storage area network that the storage resource is to be utilized; and
    diverting the traffic of the transmission to the storage resource.

10. The method of claim 9, wherein the diverting the traffic comprises instructing a transport node of the route to forward the traffic to the storage resource.

11. The method of claim 1, further comprising:
providing an identification of the storage resource to at least one transport node of the route.

12. The method of claim 1, wherein the communications network comprises a software defined network, wherein the selecting the route comprises instantiating at least one transport node in the software defined network for the route.

13. A method comprising:
receiving, by a processor, a request for a storage resource of a storage area network for a transmission between a source device and a destination device via a software defined network, wherein the storage area network is distinct from the source device and the destination device;
assigning, by the processor, the transmission to the storage resource, wherein an additional transmission is also assigned to the storage resource;
receiving, by the processor, a notification that a route for the transmission between the source device and the destination device has failed to satisfy a latency requirement; and
reassigning, by the processor, the additional transmission to a different storage resource of a plurality of storage resources of the storage area network.

14. The method of claim 13, wherein the request for the storage resource is received from a controller of the software defined network.

15. The method of claim 13, wherein the request includes at least one parameter for the transmission, wherein the assigning the transmission to the storage resource is based upon the at least one parameter.

16. The method of claim 15, wherein the at least one parameter comprises the latency requirement.

17. The method of claim 13, wherein the assigning the transmission to the storage resource comprises:
creating the storage resource in the storage area network.

18. The method of claim 13, further comprising:
releasing the storage resource when the storage resource is no longer required for the transmission.

19. The method of claim 13, wherein the storage resource is one of a plurality of storage resources assigned to the route, wherein a first storage resource of the plurality of storage resources is selected to be proximate to a first transport node of the route, and wherein a second storage resource of the plurality of storage resources is selected to be proximate to a second transport node of the route.

20. A device comprising:
a processor; and
a computer-readable medium storing instructions which, when executed by the processor, cause the processor to perform operations, the operations comprising:
receiving a latency requirement for a transmission via a communications network between a source device and a destination device;
selecting a route for the transmission through the communications network between the source device and the destination device;
submitting to a storage area network a request for a storage resource for the transmission, wherein the storage area network is distinct from the source device and the destination device;
receiving, from the storage area network, a notification of a storage resource of the storage area network assigned to the transmission; and
caching traffic of the transmission in the storage resource when the route fails to satisfy the latency requirement.

* * * * *